(12) United States Patent
Joly

(10) Patent No.: US 7,453,967 B2
(45) Date of Patent: Nov. 18, 2008

(54) SERIAL SELF-ADAPTABLE TRANSMISSION LINE

(75) Inventor: Christophe Joly, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 659 days.

(21) Appl. No.: 10/839,113

(22) Filed: May 5, 2004

(65) Prior Publication Data

US 2005/0249317 A1      Nov. 10, 2005

(51) Int. Cl.
*H04L 7/00*      (2006.01)
(52) U.S. Cl. .................................................. 375/354
(58) Field of Classification Search ......... 375/219–220, 375/257, 259, 285, 295; 327/141–142
See application file for complete search history.

(56) References Cited

U.S. PATENT DOCUMENTS

| | | | | |
|---|---|---|---|---|
| 5,671,250 A | * | 9/1997 | Bremer et al. | 375/222 |
| 6,108,390 A | * | 8/2000 | Bell et al. | 375/372 |
| 7,167,527 B1 | * | 1/2007 | Park et al. | 375/295 |
| 2003/0095606 A1 | * | 5/2003 | Horowitz et al. | 375/286 |
| 2004/0114670 A1 | * | 6/2004 | Cranford et al. | 375/132 |
| 2004/0203559 A1 | * | 10/2004 | Stojanovic et al. | 455/403 |

FOREIGN PATENT DOCUMENTS

| | | | |
|---|---|---|---|
| DE | 37 30 560 A1 | 3/1989 | 5/8 |
| EP | 0 874 500 A2 | 10/1998 | 27/10 |

* cited by examiner

*Primary Examiner*—Khanh C Tran
(74) *Attorney, Agent, or Firm*—Campbell Stephenson, LLP; Samuel G. Campbell, III

(57) ABSTRACT

A self-adaptable transmission line (SATL) according to the present invention is implemented as a single signal path coupled between an SATL transmitter and an SATL receiver. The SATL transmitter controls the process of transmission in an SATL architecture. Data to be sent by the SATL transmitter are first encoded to the appropriate symbol before being serialized and transmitted on the SATL. A symbol transfer starts with an event known as a start-of-symbol (SOS) event, which can be, for example, a low-to-high transition. The SATL receiver samples and deserializes the incoming bitstream, and then decodes the symbol thus received. Upon detection of an SOS by the SATL receiver, the SATL receiver's logic is reset to its initial state, ready to receive the next symbol.

75 Claims, 13 Drawing Sheets

SERIAL SELF-ADAPTABLE TRANSMISSION LINE

BACKGROUND OF THE INVENTION

1. Field of the Invention

This invention relates to the field of data communications, and more particularly to a method and system for operating a serial self-adaptable transmission line that provides communications between devices.

2. Description of the Related Art

Today's integrated circuits (ICs) are typically implemented using hundreds of input, output, input/output (I/O), power and ground pins, generically referred to as simply "pins". As will be appreciated, the larger number of pins, the greater complexity in the design, manufacture and use of such ICs. IC designers therefore often go to great lengths to minimize the number of pins required by the various modules of a given design, in order to reduce the overall number of pins required to implement the given IC.

Moreover, ICs sometimes required alternate paths of communication that can be called into service in the event of a failure or other situation. For example, the internal states of today's ICs are typically programmed using a processor interface. Such a processor interface can include, for example, a 32-bit data bus, a 16-bit address bus and various control signals. However, it is often desirable to program certain internal registers prior to an IC's processor interface becoming operational. For example, a PLL generating the IC's core clock may be programmed in different ways (changing bias values, frequency ratios and so on). However, that same clock may be used to operate the processor interface. Thus, the processor interface cannot be used to program the PLL, because the processor interface cannot be used until the PLL is programmed. Instead, the PLL needs to be programmed via another interface. This alternate interface should be independent from the PLL itself, and should, as noted, employ a low pin-count technique.

Another application of such a low-pin-count interface is as an output to drive a set of 16-bit LEDs. As will be appreciated, it is desirable to employ an interface can drive such LEDs without the IC being required to generate and output 16 different signals, due to the number of pins that would be required by such an approach. As will be appreciated, then, the need for low-pin count interfaces appears in many situations in today's devices. This need has led to the development of a variety of interface standards, such as asynchronous serial communications (e.g., RS-232) and other such approaches (e.g., the inter-IC (I²C) bus).

Unfortunately, such interfaces are not without their infirmities. Such interfaces may require a certain frequency relationship between the receiver and the transmitter for proper operation, potentially limiting the devices that are able to communicate with one another. Moreover, such interfaces are sometimes proprietary in nature. Often, such interfaces require more than one input or output pin on an IC implementing the given technique. More specifically, a communications link between ICs typically requires a minimum of two signal lines, one signal line for the clock signal, and one signal line for the serialized datastream, although other solutions require many more signal lines (e.g., RS-232). The I²C-bus is an example of a serial protocol that employs two wires. Such techniques provide a relatively low-pin count solution, and so are very attractive in pin-limited designs. However, it is desirable to allow flexibility in clocking relationships, as well as to further reduce the pin-count required and to avoid proprietary technology.

What is desired, then, is to reduce the number of communication lines to a single communications line, in order to further reduce the pin count of ICs employing such a technique, as well as the area consumed by printed circuit board layouts in such designs. It is also desirable to keep the logic used to implement such a communications protocol simple, in order to minimize the area required on the integrated circuit. Moreover, as noted, such a technique should allow flexibility in the relationship between the transmitter and receiver clocks.

SUMMARY OF THE INVENTION

In one embodiment, a receiver is disclosed. This receiver includes a symbol decoder and a start-of-symbol detector. The start-of-symbol detector is coupled to receive a start-of-symbol signal from the symbol decoder In another embodiment, a transmitter is disclosed. This transmitter includes an encoder. The encoder is configured to generate a symbol based on a value of information received by the encoder. The symbol comprises a plurality of symbol elements. The encoder is further configured to set each of a first number of the symbol elements to a first logical value, if the value is equal to a first value. The encoder is further configured to set each of a second number of the symbol elements to the first logical value, if the value is equal to a second value. The encoder is further configured to set each of a third number of the symbol elements to the first logical value, if the encoder is to generate a synchronization symbol. The first number is greater than the second number, the third number is not equal to the first number, and the third number is not equal to the second number.

In yet another embodiment, a method is disclosed. This method includes receiving a symbol, incrementing a count in response to the symbol, decrementing the count in response to the symbol, comparing the count to a first limit, and generating a data value. The generating thus performed is based on comparing the count to the first limit.

In still another embodiment, a method is disclosed. This method includes generating a first number of a first number of symbol elements of a first symbol and generating a second number of a second number of symbol elements of a second symbol. The first symbol is a synchronization symbol, and each of the first number of the first number of symbol elements have a first logical value. The second symbol represents a data value of data encoded in the second symbol. Each of the second number of the second number of symbol elements have the first logical value, and the first number is not equal to the second number. The second number is equal to a third number, if the data value is equal to a first value, and the second number is equal to a fourth number, if the data value is equal to a second value. The third number is greater than the fourth number.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Introduction

A self-adaptable transmission line (SATL) according to the present invention is implemented as a single signal path (e.g., wire) coupled between an SATL transmitter and an SATL receiver. The SATL transmitter controls the process of transmission in an SATL architecture. Data to be sent by the SATL transmitter are first encoded to the appropriate symbol before being serialized and transmitted on the SATL. A symbol transfer starts with an event known as a start-of-symbol (SOS) event, which can be, for example, a low-to-high transition. The SATL receiver samples and deserializes the incoming bitstream, and then decodes the symbol thus received. Upon detection of an SOS by the SATL receiver, the SATL receiver's logic is reset to its initial state, ready to receive the next symbol.

An Example Architecture Employing a Self-Adaptable Transmission Line

Figure 1:
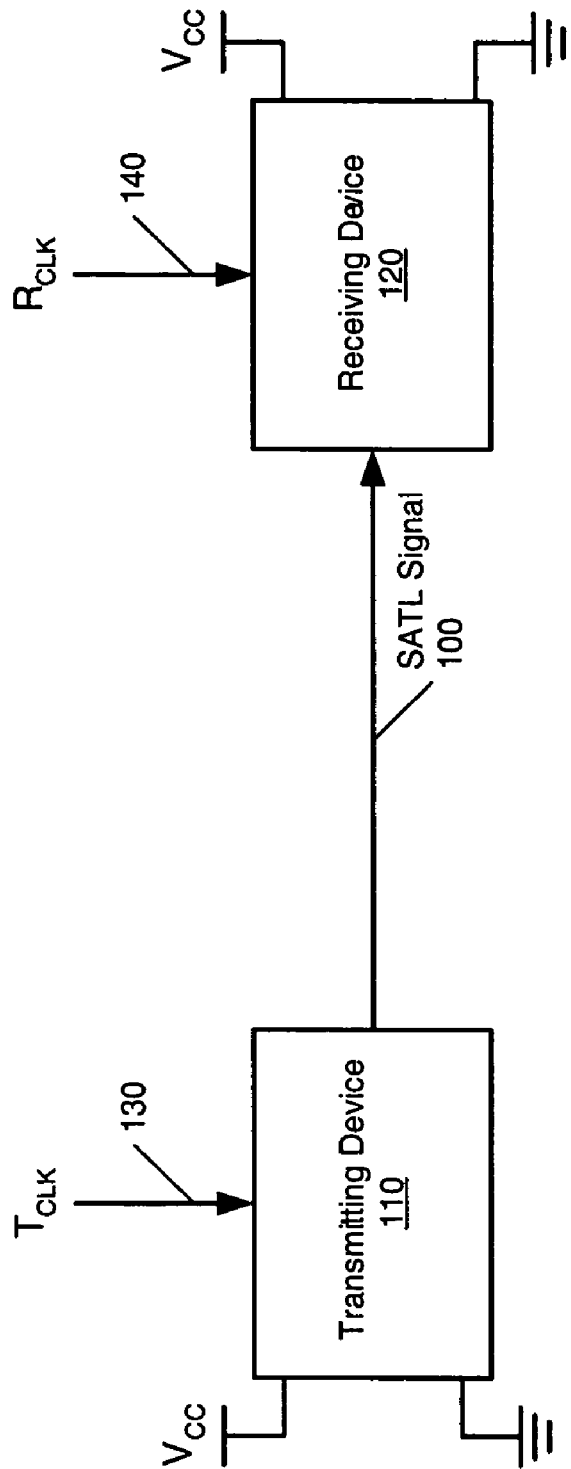
FIG. 1 is a block diagram illustrating the use of a self-adaptable transmission line (SATL) according to the present invention.

FIG. 1 is a block diagram illustrating the use of a self-adaptable transmission line (SATL) according to the present invention. Shown in FIG. 1 is an SATL signal 100 coupling a transmitting device 110 and a receiving device 120. Transmitting device 110 receives a transmit clock ($T_{CLK}$) 130, which is used to time the data transmitted by transmitting device 110 as SATL signal 100. In a similar fashion, receiving device 120 receives a receive clock ($R_{CLK}$) 140, which is used to time the receipt of the signal carried by SATL signal 100. Also shown are the power ($V_{CC}$) and ground connections for transmitting device 110 and receiving device 120. It will be appreciated that, while multiple SATL lines can be used in conjunction with one another, a primary advantages are the reduction in pin count and circuit complexity.

Figure 2:
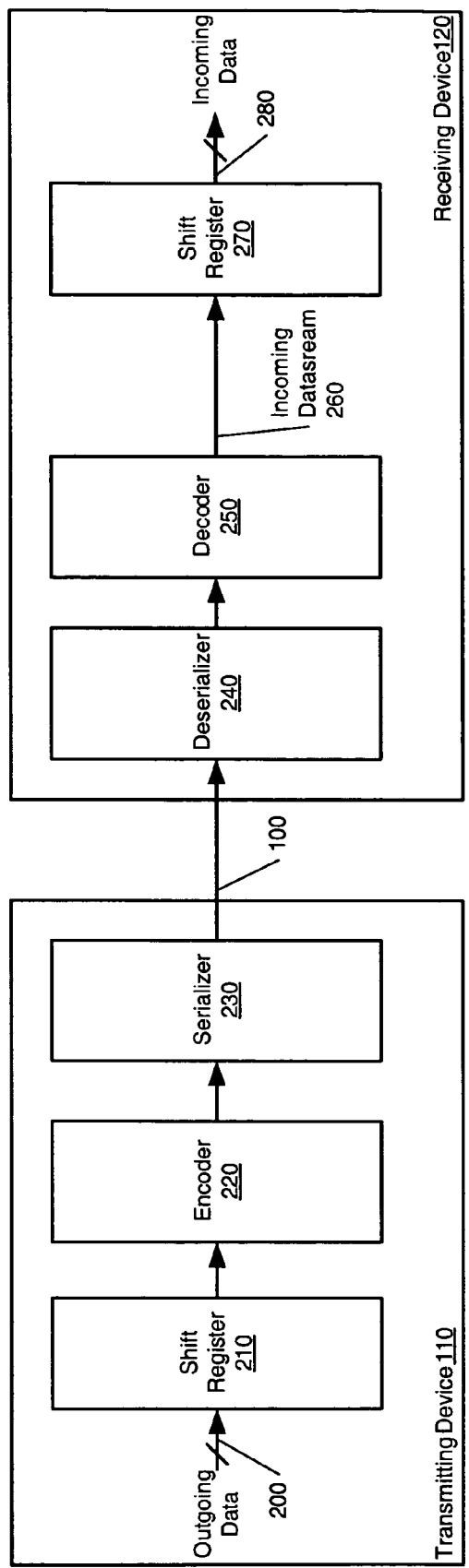
FIG. 2 is a block diagram showing an example of the components within a transmitting device and a receiving device in an embodiment of the present invention.

FIG. 2 is a block diagram showing an example of the components within transmitting device 110 and receiving device 120 in one embodiment of the present invention. In this embodiment, transmitting device 110 receives outgoing data 200. Outgoing data 200 is typically presented to transmitting device 110 as a bus (i.e., a word of parallel bits of some appropriate width). Because SATL signal 100 is typically a single serial channel, a word width of some number of bits requires that a parallel-to-serial conversion be performed. Thus, transmitting device 110 includes, in the embodiment depicted in FIG. 2, a shift register 210 that receives and stores the outgoing data word received as outgoing data 200. Shift register 210 which receives and stores the outgoing data word (received as outgoing data 200). Shift register 210 provides this outgoing data word to an encoder 220 by shifting out the bits of the outgoing data word, in a serial fashion. Encoder 220 encodes the outgoing data word as per the protocol described subsequently in connection with FIGS. 11, 12, and 13.

Encoder 220 thus creates a symbol for each bit of outgoing data 200, and presents the symbols thus created to a serializer 230, which takes in each symbol and outputs the symbol elements of each symbol (typically, the bits of each symbol) in a serial fashion. Thus, as will be appreciated, two parallel-to-serial conversions are performed by the elements of transmitting device 110, the first being within shift register 210 and the second being within serializer 230. In the former case, serializer 230 serializes the parallel bits of each symbol generated by encoder 220 into a bitstream for transmission as SATL signal 100.

In corresponding fashion, receiving device 120 receives SATL signal 100 at a deserializer 240, which performs a serial-to-parallel conversion on the bits of SATL signal 100. Deserializer 240 provides the symbols thus generated to a decoder 250. Decoder 250 generates an incoming data stream 260 by decoding the symbols received from deserializer 240 from symbols into the actual data bits those symbols represent. As will be appreciated, incoming data stream 260 is a bitstream, and so corresponds to the output of shift register 210. In the typical case, outgoing data 200 has a word width of some number of bits, and so incoming data stream 260 is deserialized to reconstruct the counterpart of outgoing data 200. This serial-to-parallel conversion is performed by a shift register 270, which generates incoming data 280. Thus, in the manner of transmitting device 110, receiving device 120 performs two serial-to-parallel conversions (corresponding to the two parallel-to-serial conversions performed by the elements of transmitting device 110). As a result, incoming data 280 has a word width of some number of bits, and typically, the same number of bits as outgoing data 200. As will be appreciated, this need not be the case, and a different number of bits can therefore be used for incoming data 280, if such is desirable.

A protocol compatible with the present invention sets the default parameters:
1) Number of symbols;
2) Maximum clock ratio between the transmitter and the receiver
   $(1 \leq R_{CLK}/T_{CLK} \leq X)$; and
3) Serial bit margin (serialBitMargin) between symbols.

In an embodiment of the present invention, each symbol has a value indicating how long the SATL signal is set to a logic "1" after an SOS, using the following notation:
$A^{\pm 1}$ where A indicates the length of SATL=1 for that symbol, and $^{\pm 1}$ represents the asynchronous interface between the transmitter and receiver clocks (one SATL=1 or SATL=0 may not be latched properly by the receiver). The lowest symbol starts at $2^{\pm 1}$ instead of $1^{\pm 1}$, because the receiver needs to detect a low-to-high transition (signifying an SOS event).

Thus:

$$symbol[0] = 2^{\pm 1}$$
$$symbol[i]_{min} = symbol[i-1]_{max} + serialBitMargin$$
$$= symbol[i-1] + 1 + serialBitMargin$$
$$serialBitLength \geq symbol[n]_{max} + serialBitMargin$$

As will be appreciated, keeping both serialBitMargin and the serial-bit length (serialBitLength) to power-of-two values simplifies implementation of this embodiment in hardware by allowing the use of shift registers, rather than multipliers and dividers.

One embodiment of the present invention employs three symbols with a serialBitMargin of 2. The transmitter-to-receiver clock ratio ranges from 1 to 20. Each symbol is 16 bits long, and is represented as shown in Table 1 below.

TABLE 1

An example symbol table.

| Symbol | Encoding |
|---|---|
| "0" | 11110000_00000000 |
| "SYNC" | 11111111_00000000 |
| "1" | 11111111_11110000 |

Figure 3:
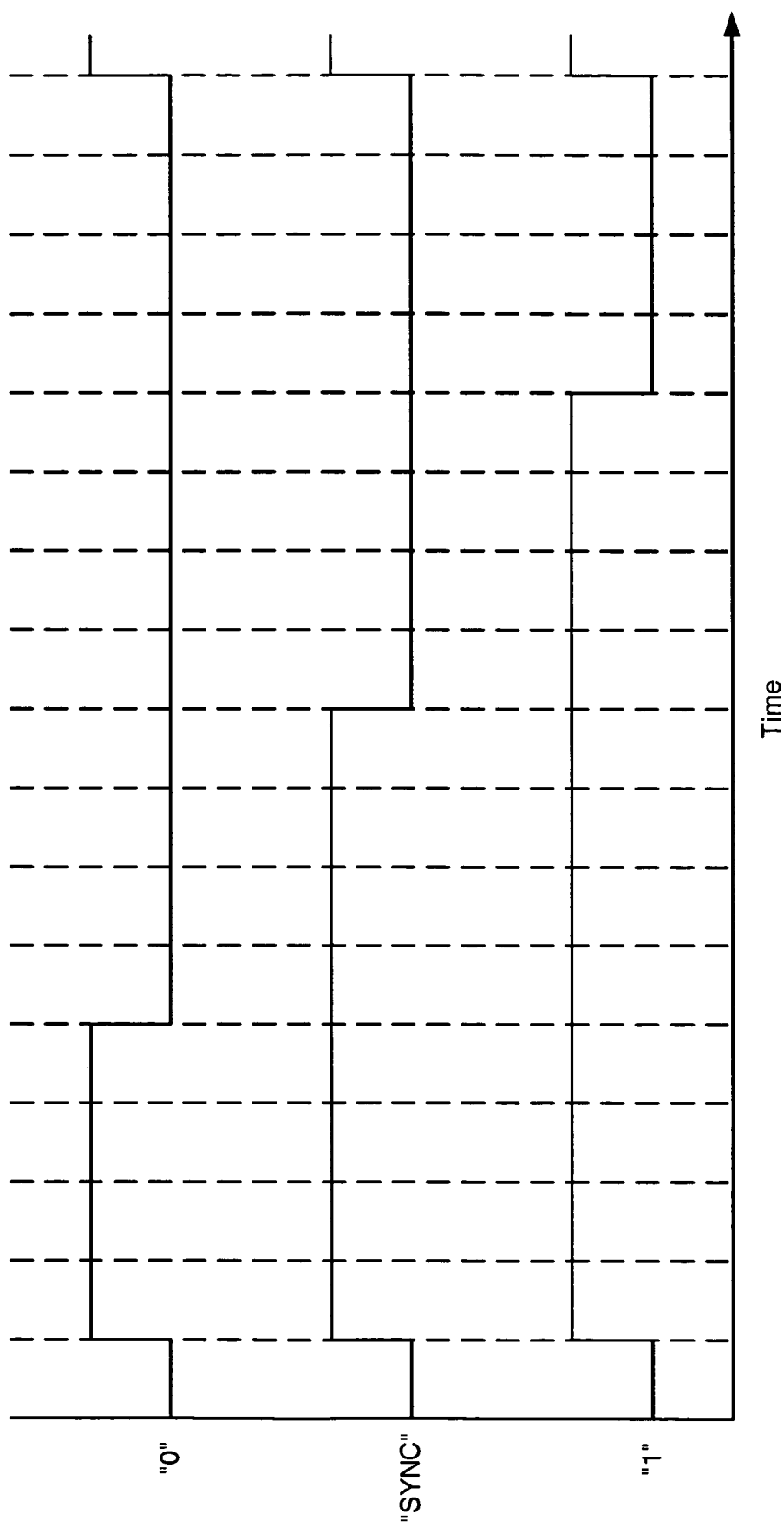
FIG. 3 is a graph depicting a waveform representation of a scheme according to the present invention.

FIG. 3 is a graph depicting a waveform representation of the above scheme is employed. As can be seen, each symbol (here, the symbols being "0", "SYNC", and "1", as in Table 1) consumes 16 bit times. As can also be seen, the symbol "0" includes four bit times (the first four) of logic ones (in contrast to the "1" symbol), followed by 12 bit times of logic zeroes (in contrast to the "0" symbol). Similarly, the synchronization ("SYNC") symbol includes eight bit times of logic ones, followed by eight bit times of logic zeroes. Finally the symbol "1" includes 12 bit times of logic ones and four bit times of logic zeroes.

As will be appreciated, the encoding scheme presented in connection with FIG. 3, and elsewhere herein, is but one example of an encoding scheme according to the present invention. The data values represented by each symbol need not be encoded as noted herein, but can be encoded using other representations. For example, the graph of FIG. 3 might be interpreted as representing another sequence of symbols, such as "0"-"1"-"SYNC", "SYNC"-"0"-"1", or some other sequence. Moreover, the sequences of bits representing each symbol need not be evenly distributed. For example, a bit pattern of 11111111_11111100 could be used for a "1" symbol, once again a bit pattern of 11111111_00000000 could be used for a "SYNC" symbol, and a bit pattern of 11000000_00000000 could be used for a "0" symbol.

In fact, as will be appreciated, any number of variants of the basic concepts presented herein can be implemented according to the present invention. For example, the sequences of bits representing each symbol need not be contiguous. Because the main goals are to use a certain overall count (within certain bounds, at least) to represent a given symbol and to examine/reset that count at a certain point in time (e.g., at SOS) in order to determine the current symbol and prepare for the next symbol, any approach that employs bit patterns that provide such information are acceptable. For example, a bit pattern of 11111100_11111100 could be used for a "1" symbol, once again a bit pattern of 11110000_11110000 could be used for a "SYNC" symbol, and a bit pattern of 11000000_11000000 could be used for a "0" symbol. In such an implementation, a mechanism is provided to distinguish an SOS from a similar transition that occurs within a symbol (e.g., using a predefined sequence of symbols at the start of a transmission, comparing the first and second halves of the current symbol or the like), although the counting would still be performed as described elsewhere herein (e.g., a sample of logic "1" would cause the count to increase, and a sample of logic "0" would cause the count to decrease).

It will be appreciated that the minimum clock ratio may affect the bit patterns that can be successfully employed. For example, the fewer samples/bit time that are taken by the receiver, the longer the string of logic "1"'s (or logic "0"'s) needs to be, in order for the symbol to be correctly identified by the receiver. It will be further appreciated that these and other variations will be apparent to one of skill in the art, in light of the present description, and so are considered to be within the scope of the present invention.

The serialBitLength is determined for this example based on the following default parameters, in the manner described previously:

1) Number of symbols=3
2) Minimum clock ratio=1
3) SerialBitMargin=2

The minimum encoding scheme is determined by the following calculations:

$symbol[0]=2^{\pm 1}$
$symbol[1]_{min}=symbol[0]_{max}+serialBitMargin=3+2=5$
$symbol[1]=6^{\pm 1}$
$symbol[2]_{min}=symbol[1]_{max}+serialBitMargin=7+2=9$
$symbol[2]=10^{\pm 1}$ Thus, the minimum serialBitLength is equal to 11 plus the serialBitMargin. As will be appreciated, using a serialBitLength of 16 bits in this case meets these requirements, while simplifying the design and implementation of the hardware employed in realizing a system according to the present invention. It will also be appreciated that, for a given serialBitLength (e.g., 16 bits), several different numbers of symbols may be able to be implemented (e.g., for a serialBitLength of 16 bits, the number of symbols can be 3, 5 or 7, for example). Again, if a non-contiguous bit pattern is used, some mechanism for distinguishing between an SOS and a similar transition within a symbol is mandated.

Figure 4:
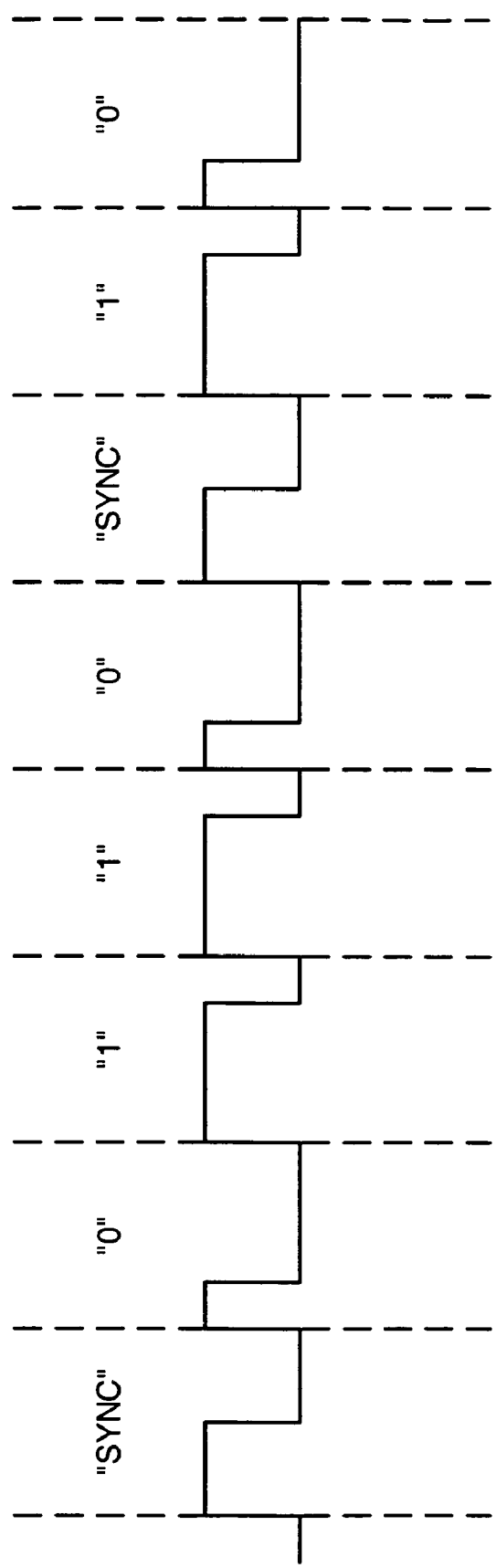
FIG. 4 is an illustration of an encoded bitstream, encoded according to the present invention.

FIG. 4 is an illustration of a bitstream that reflects symbols encoded according to the present invention. As can be seen, interspersed among the symbols representing the data are periodic "SYNC" symbols, which are sent regularly, to ensure synchronization of the receiver. Thus, in the example depicted in FIG. 4, a "SYNC" symbol is sent followed by the symbols for "0110" (depicted in FIG. 4 as "0", "1", "1", and "0"). After the four symbols are sent, another "SYNC" symbol is sent and the process repeats with the symbols for the next four data bits (the first two of which are shown in FIG. 4; "1" and "0"). As will be appreciated, a "SYNC" symbol allows an SATL receiver to synchronize itself with the incoming bitstream by providing a symbol that, nominally, will result in the same number of logic ones and logic zeroes being sampled from the incoming symbol's bitstream (although, given the potential for sampling noise, some sort of noise margin is typically employed that allows some acceptable deviation from this ideal, while still identifying the symbol as a "SYNC" symbol). Thus, the logic-one-to-logic-zero transition (in contrast to an SOS, which is just the opposite (a logic-zero-to-logic-one transition), in the embodiment discussed here) is centered between SOS events. This basically provides a 50% duty cycle signal at the transmit clock's frequency divided by the serialBitLength (here, 16 bits), providing the maximum distance between the logic-one-to-logic-zero transition, and the preceding/following SOSs (logic-zero-to-logic-one transitions).

Logic designed to implement the present invention requires a few parameters, counters and variables to deserialize and decode the data stream. Parameters are typically a hard-coded value, which determine the working range of the transmitter-receiver pair. As will be appreciated (and as described subsequently), such information can also be programmed into registers, allowing a transmitter-receiver pair according to the present invention to be reconfigured, as desired. These parameters, counters and variables, as well as their meaning and their values, are given in Table 2.

incoming data stream, and in fact, allow such adjustment to occur on every SOS event. The watermarks for the current symbol can actually be based on the result of the previous symbol and SOS.

The present invention's self-adaptability is advantageous in several respects. As will be appreciated, the present invention largely decouples the receive clock ($R_{CLK}$) from the transmit clock ($T_{CLK}$) by employing a sampling technique that requires only the identification of certain points in the incoming SATL signal. In fact, in certain embodiments, only one point need be identified: the SOS, which is used both to identify the point at which the count is to be evaluated and to reset the count in preparation for decoding the next symbol. The only information regarding the relationship between $T_{CLK}$ and $R_{CLK}$ that is needed is the maximum ratio of $T_{CLK}$ to $R_{CLK}$ (i.e., maxClockRatio, from Table 2).

TABLE 2

An example of variables, counters and parameters.

| Name | Description | Type | Value |
|---|---|---|---|
| serialBitLength | Number of serial bits per symbol. | parameter | specified |
| maxClockRatio | Maximum clock ratio. ($T_{CLK}/R_{CLK}$) | parameter | specified |
| maxSampleSetCnt | Maximum value of the sample set counter. | parameter | serialBitLength * maxClockRatio |
| serialBitMargin | Margin in bit for the "SYNC" symbol. | parameter | specified |
| middlePoint | The middle point from which incrementing starts, upon receipt of an SOS (in the example given here). | parameter | middlePoint > maxSampleSetCnt + serialBitMargin * maxClockRatio |
| sampleSetCnt | S-bit counter to count the number of samples between two SOS events for which the value of SATL = 1. | counter | middlePoint, at SOS<br>+1 if SATL = 1<br>−1 if SATL = 0<br>S formula:<br>($2^S/2$) > middlePoint; or<br>$2^{(S-1)}$ > middlePoint |
| sampleCnt | (S-1)-bit counter to count the number of samples between two SOSs. | counter | 0 when SOS<br>+1 otherwise |
| clockRatio | Ratio between the receiver clock and the transmitter clock. | variable | sampleCnt/serialBitLength, at SOS |
| lowWaterMark (LWM) | Low water mark, the lower limit of setSampleCnt at (or below) which a symbol "0" is detected. | variable | middlePoint − (serialBitMargin * clockRatio) |
| highWaterMark (HWM) | High water mark, the upper limit of setSampleCnt at (or beyond) which a symbol "1" is detected. | variable | middlePoint + (serialBitMargin * clockRatio) |

A protocol according to the present invention is scalable in a number of ways, including changes to:
1) Number of symbols (by increasing the serial-bit length: bitPerSymbol),
2) Maximum clock ratio (by increasing sample counter size: sampleSetCnt), and
3) Minimum clock ratio (by increasing both the serial-bit length and the sample counter size: bitPerSymbol and sampleSetCnt).

All three of these variables (clockRatio, lowWaterMark and highWaterMark) allow the receiver to self-adjust to the As will be appreciated, the theoretical lower limit of the range of ratios of $T_{CLK}$ to $R_{CLK}$ is 1:1, which is the minimum needed to ensure that the SATL receiver generates a bit for each bit transmitted by the SATL transmitter. However, this assumes that the SATL signal generated using $T_{CLK}$, is sampled at a point at which aliasing is not an issue. To ensure this is the case, one would have to employ some mechanism that would allow the SATL receiver to know when to sample (i.e., some mechanism that defines the phase relationship between $T_{CLK}$ and $R_{CLK}$ (as the frequency relationship would already be known, that being 1:1)).

Thus, in implementing a communications system according to the present invention, it is desirable to employ a minimum ratio of $T_{CLK}$ to $R_{CLK}$ of more than 1:1 (i.e., $R_{CLK} > T_{CLK}$). In so doing, the SATL signal is effectively over-sampled, thus allowing such a system to tolerate an erroneous sample. By selecting a minimum ratio of more than 1:1, the SATL receiver is thus able to generate the correct symbol. The parameter serialBitMargin, noted above, is related to this concept, in that serialBitMargin defines the system's tolerance for "sampling noise". This sampling noise is the number of samples that such a system can count in the case of a synchronization symbol, above or below the middle-Point, and still decode the symbol being sampled as a synchronization symbol ("Sync" symbol). Thus, the watermarks are set using the serialBitMargin, and allow such a system to tolerate a given amount of noise.

This is also advantageous because no synchronization circuitry is required. By avoiding the need for phase-locked loops (PLLs) and the like, implementation of a SATL transmitter and receiver is simplified. Moreover, the resulting receiver design is smaller, thus consuming less IC area and reducing IC cost. The area requirements of such a design are also minimized by limiting the size of the counter used in the SATL receiver (for setSampleCount) to S bits, where:

$$2^{(S-1)} > \text{middlePoint}$$

$$\text{middlePoint} > \text{maxSampleSetCnt} + (\text{serialBitMargin} * \text{maxClockRatio})$$

Since, $$\text{maxSampleSetCnt} = \text{serialBitLength} * \text{maxClockRatio}$$

Then, $$2^{(S-1)} > \text{middlePoint} > (\text{serialBitLength} + \text{serialBitMargin}) * \text{maxClockRatio}$$

$$2^{(S-1)} > (\text{serialBitLength} + \text{serialBitMargin}) * \text{maxClockRatio}$$

$$S > \text{SQRT}((\text{serialBitLength} + \text{serialBitMargin}) * \text{maxClockRatio}) + 1$$

The above calculation can be taken to imply that S is an integer, such that the size of the setSampleCnt counter is sized to some power of 2. As will also be appreciated from the above calculation, S is therefore proportionally related to the maxClockRatio. Once the maxClockRatio is selected, the size of the setSampleCnt counter can then be set. This allows the IC designer to use their judgment as to the tradeoff between the IC area consumed by the design, and the clock ratios to be supported. In a converse sense, $R_{CLK}$ and/or $T_{CLK}$ (and so maxClockRatio) can be set to avoid sampling the SATL signal at a rate that could overflow the SATL receiver's setSampleCnt counter. This allows a circuit designer to choose appropriate values for $R_{CLK}$ and/or $T_{CLK}$ in light of the architectural choices made by the IC designer. Thus, $T_{CLK}$ can be, and typically is, completely independent of $R_{CLK}$, and vice versa. It will This ability to tolerate variations in the frequency and phase relationship between $T_{CLK}$ and $R_{CLK}$ is also advantageous because their relationship can vary dynamically. Once a range of clock ratios is determined, a system according to the present invention can be programmed to use any clock ratio within that range, by properly selecting serialBitLength, maxClockRatio and serialBitMargin. This information can be changed dynamically, at each data word, or even at each symbol, in order to account for changes in clock frequencies, environmental effects (e.g., altering the maximum transmission frequency) and other such conditions.

Figure 5:
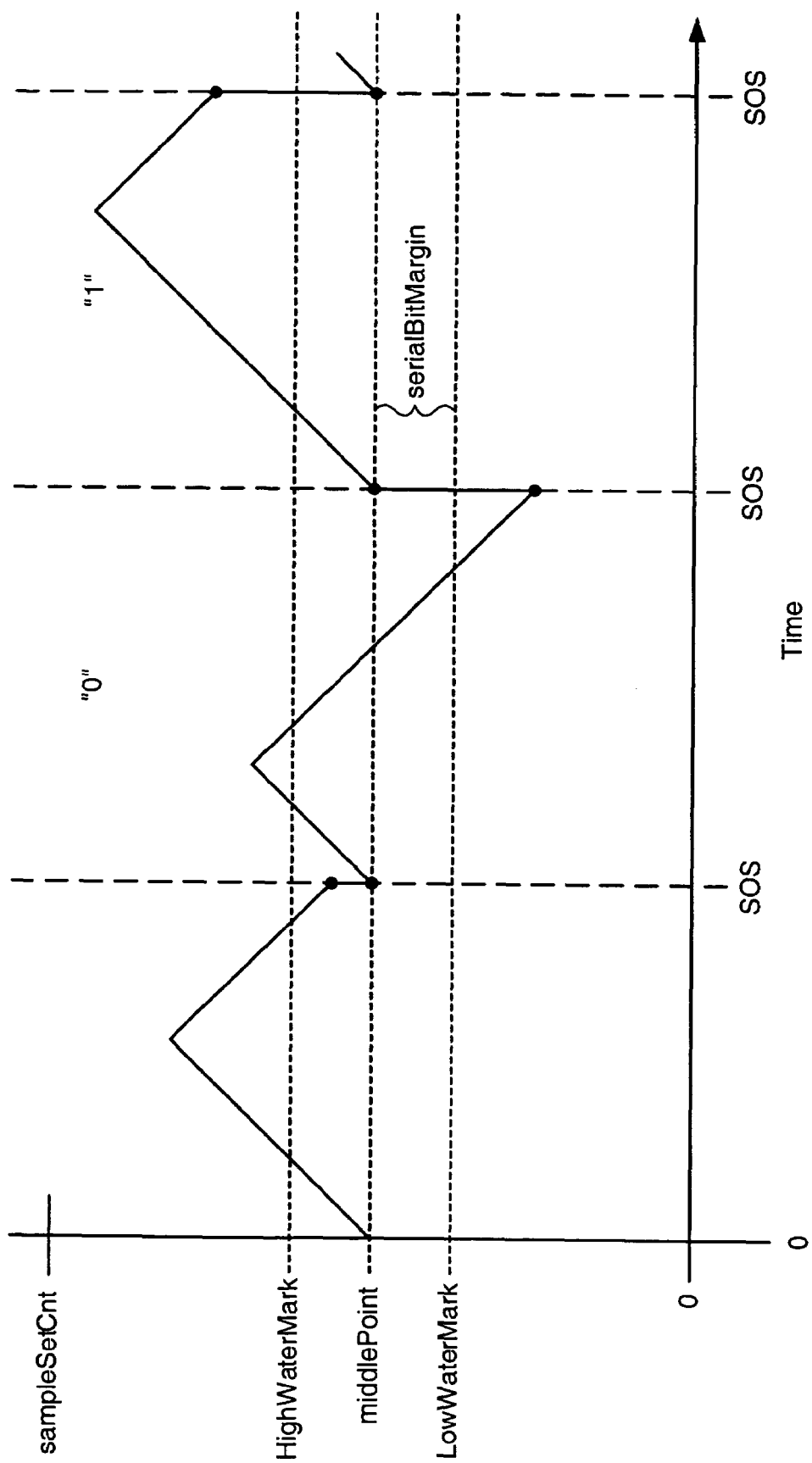
FIG. 5 is a graph illustrating the receipt and conversion of an SATL data stream according to the present invention.

FIG. 5 is a graph illustrating the value of sampleSetCnt as an SATL data stream is received and converted. As can be seen in FIG. 5, sampleSetCnt begins at a middlePoint and is incremented as logical 1's are detected by the SATL receiver. This continues until logical 0's are detected, at which point sampleSetCnt is decremented for each 0 received by the SATL receiver. This continues until a start-of-symbol (SOS) is detected, that being a logical 0 to logical 1 transition, in the implementation described herein. Upon the detection of an SOS, the SATL receiver determines the value of the sampleSetCnt, and how it compares with the HighWaterMark (HWM) and LowWaterMark (LWM). If the sampleSetCnt is greater than the HighWaterMark, a symbol "1" has been detected; if the sampleSetCnt is below the LowWaterMark, a "0" symbol has been detected; and if the sampleSetCnt is between the LowWaterMark and the HighWaterMark, a "SYNC" symbol has been detected. Thus, the example depicted in FIG. 5, the first starter symbol results in the detection of a "SYNC" symbol, the second starter symbol results in the detection of a "0" symbol, and the detection of the third starter symbol results in the detection of a "1" symbol.

The variables, counters and parameters discussed above are best illustrated by an example. Table 3 provides a configuration example for the receiver for $T_{CLK} = 20$ MHz and $R_{CLK} = 200$ MHz.

TABLE 3

Receiver configuration example.

| Name | Value | Note |
|---|---|---|
| serialBitLength | 16 | |
| maxClockRatio | 20 | |
| maxSampleSetCnt | 16 * 20 = 320 | |
| serialBitMargin | 2 | |
| middlePoint | 320 + (2 * 20) = 360 | |
| sampleSetCnt | depends on the symbol | $2^S/2 > 360$, so $S = 10$ |
| sampleCnt | 16 * 10 = 160 | $S - 1 = 9$ |
| clockRatio | 160/16 = 10 | |
| lowWaterMark | 360 − (2 * 10) = 340 | |
| highWaterMark | 360 + (2 * 10) = 380 | |

It is to be understood that the serialBitMargin is 2, in this example, as a result of MIN(symbol[1]=$6^{\pm 1}$)−MAX(symbol[0]=$2^{\pm 1}$)=5−3=2.

Figure 6:
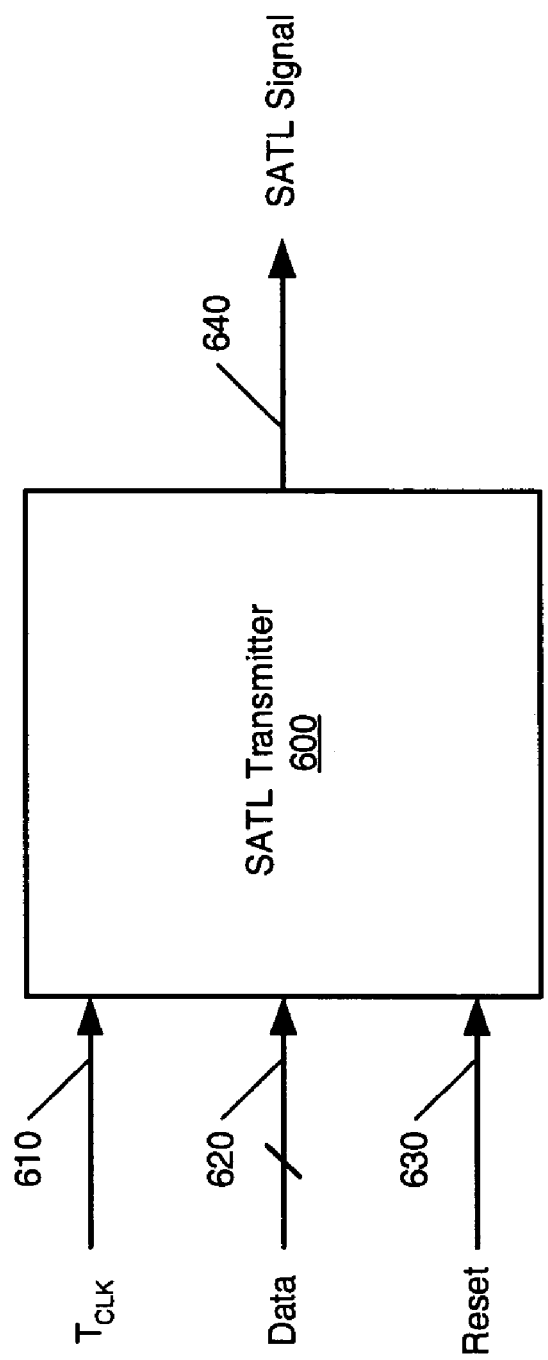
FIG. 6 is a block diagram of an SATL transmitter according to the present invention.

FIG. 6 is a block diagram of an SATL transmitter 600 according to the present invention. As before (in FIG. 1), the SATL transmitter (SATL transmitter 600) receives a transmit clock ($T_{CLK}$) 610. SATL transmitter 600 also receives data 620, which corresponds to outgoing data 200 of FIG. 2. In order to put SATL transmitter 600 into a known state, SATL transmitter 600 also receives a reset signal 630. In turn, SATL transmitter 600 generates and transmits an SATL signal 640 that corresponds to SATL signal 100 of FIG. 1.

Figure 7:
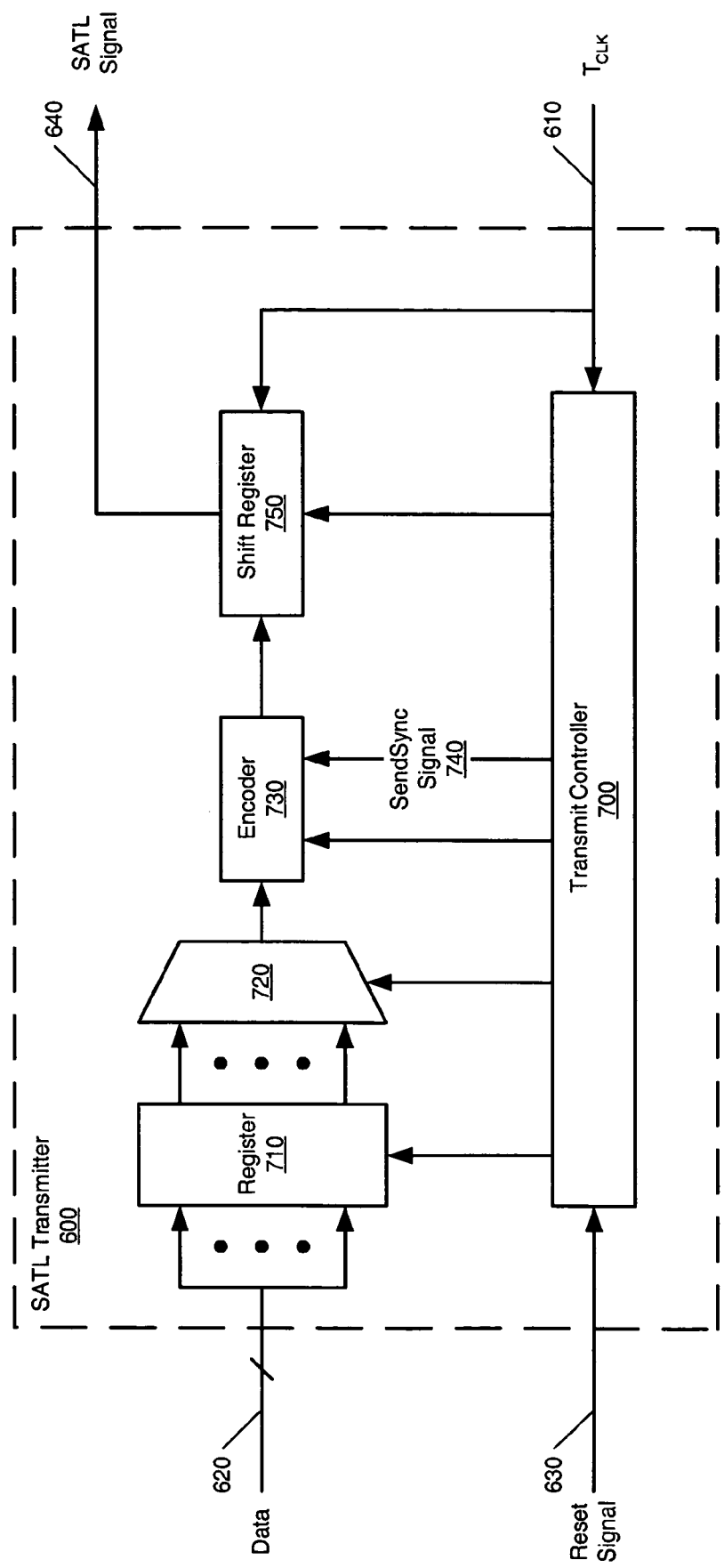
FIG. 7 is a block diagram illustrating an SATL transmitter according to the present invention in greater detail.

FIG. 7 is a block diagram illustrating SATL transmitter 600 in greater detail. As before, SATL transmitter 600 receives transmit clock 610, data 620, and reset signal 630, and generates SATL signals 640. As depicted in FIG. 7, SATL transmitter 600 includes a transmit controller 700, which is configured to control the various elements of SATL transmitter 600 and in so doing, effect the protocol according to the present invention. Transmit controller 700 receives reset signal 630, and in turn, resets the elements of SATL transmitter 600. Transmit controller 700 also distributes clocking signals to the various elements of SATL transmitter 600, having received transmit clock 610.

Data 620 is received by a register 710, which stores the value of the data value (e.g., a data word of one or more data bits) presented as data 620. Register 710 then presents this data to a multiplexer 720. Multiplexer 720, under the control of transmit controller 700 selects bits from the data held in register 710 for presentation to an encoder 730. As part of implementing a protocol according to the present invention, transmit controller 700 generates a sendSync signal 740. Transmit controller 700 provides sendSync signal 740 to encoder 730 in order to indicate to encoder 730 that encoder 730 should not encode a data bit during the current symbol time, but should instead encode the symbol for a "SYNC" symbol. Thus, transmit controller 700 controls the stream of symbols generated by encoder 730. Encoder 730 provides these symbols to a shift register 750, which serializes the bits of the given symbol, under the control of transmit controller 700 and in a manner synchronous with transmit clock 610. In so doing, shift register 750 creates the bitstream that is presented as SATL signal 640.

Figure 8:
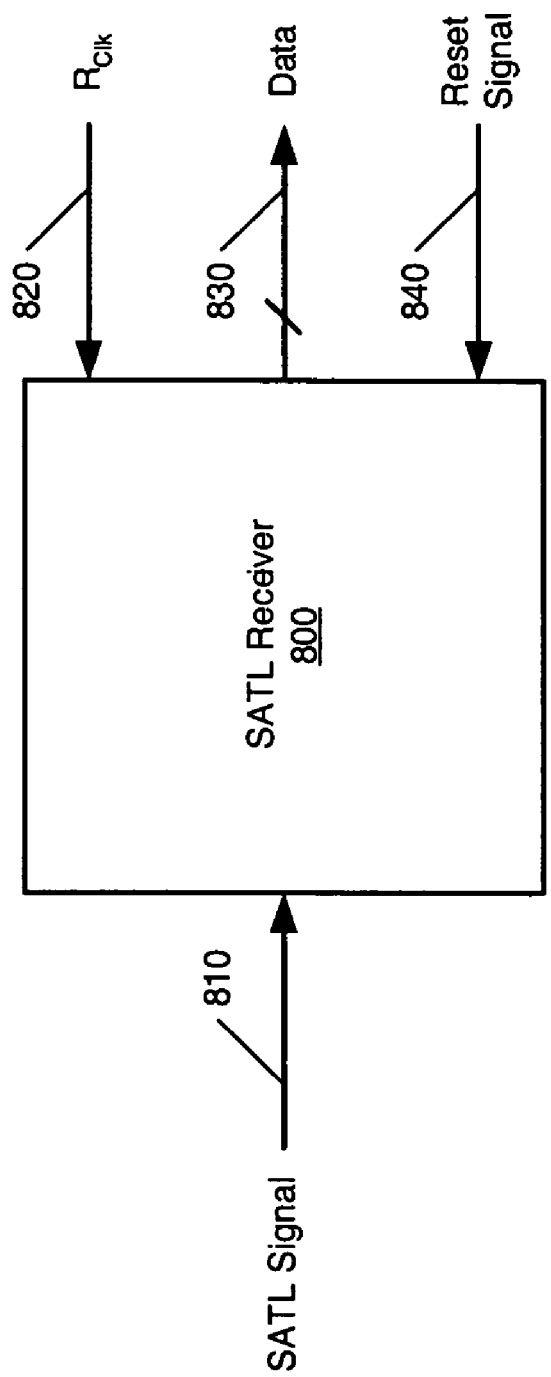
FIG. 8 is a block diagram illustrating an SATL receiver according to the prevent invention.

FIG. 8 is a block diagram illustrating an SATL receiver 800 according to the prevent invention. SATL receiver 800 receives an SATL signal 810, which corresponds to the SATL signal generated by an SATL transmitter such as SATL transmitter 600 (e.g., SATL signal 640). SATL receiver 800 also receives a receive clock ($R_{CLK}$) 820, which is used to clock the elements of SATL receiver 800 and to sample SATL signal 810 at the appropriate times. By sampling SATL signal 810 at the appropriate times and processing the information thus received, SATL receiver 800 is able to recover the data thus transmitted, which appears at an output of SATL receiver 800 as data 830. SATL receiver 800 also receives a reset signal 840, which allows SATL receiver 800 to be initialized.

Figure 9:
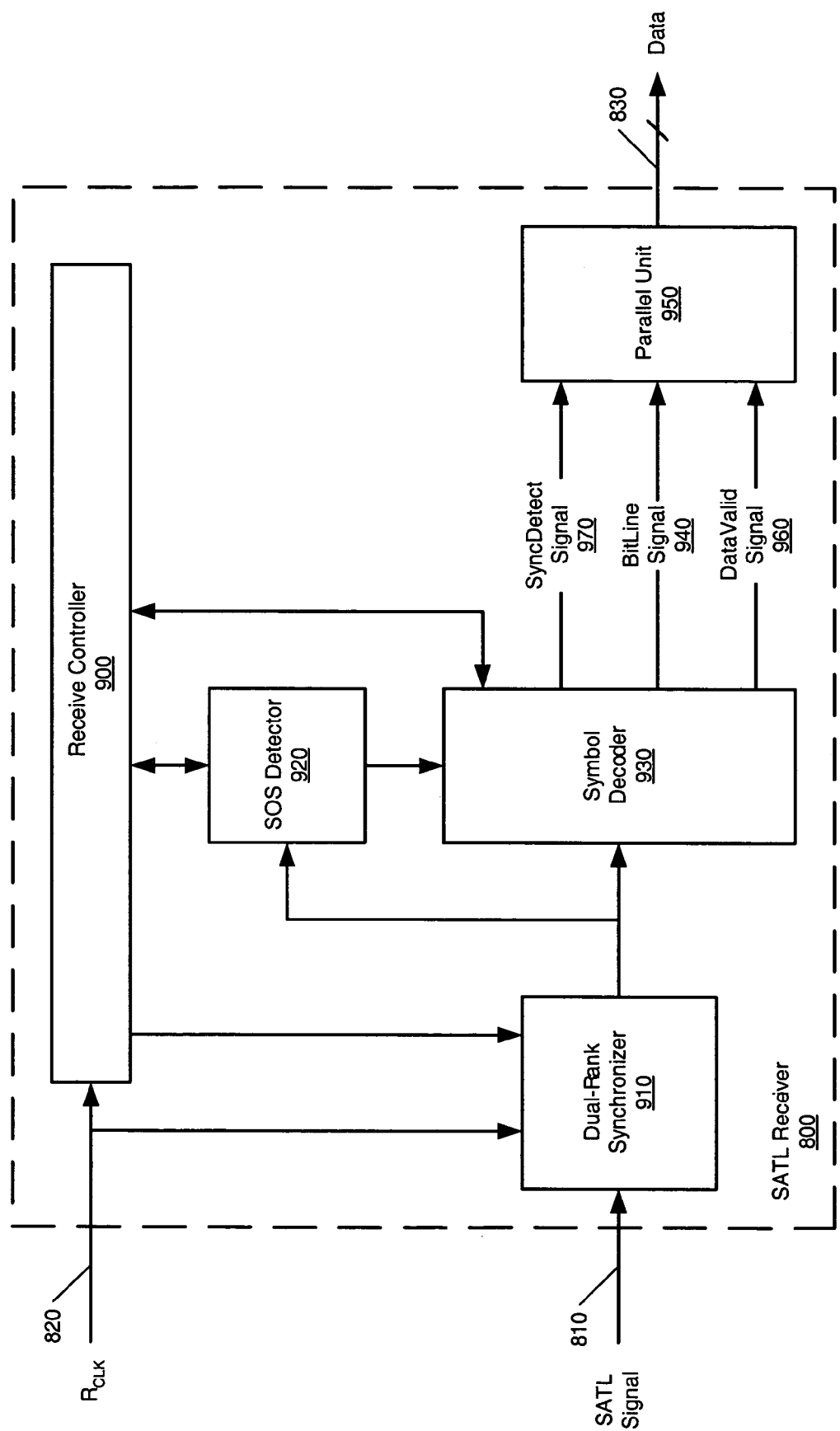
FIG. 9 is a block diagram illustrating the elements of an SATL receiver according to the present invention in greater detail.

FIG. 9 is a block diagram illustrating the elements of SATL receiver 800 in greater detail. As before, SATL receiver 800 receives SATL signal 810, and detects and decodes the data in SATL signal 810 by sampling SATL signal 810 using receive clock 820, thus generating data 830. In a manner similar to that transmitter 600, SATL receiver 800 includes a receive controller 900, which controls various aspects of the operation of the SATL receiver 800. Under the control of receive controller 900, a dual-rank synchronizer 910 receives SATL signal 810 and synchronizes SATL signal 810 to be sampled using receive clock 820. Dual-rank synchronizer 910 provides this synchronized signal to both a start-of-symbol (SOS) detector 920 and a symbol decoder 930. As its name implies, SOS detector 920 detects the start of a given symbol. For example, SOS detector 920 can be configured to detect a low-to-high transition in the synchronized signal generated by dual-rank synchronizer 910. SOS detector 920 provides this indication to symbol decoder 930, in order to allow symbol decoder 930 to recognize the point at which the current symbol begins.

Symbol decoder 930 then consumes an appropriate number of bits (i.e., the number of bits used to represent a symbol), and generates an output bit corresponding to the data bit represented by the symbol received. This decoded symbol (i.e., data bit) is presented as BitLine signal 940. BitLine signal 940 is received by a parallel unit 950, which converts the data bits received via bit line signal 940 into a data word, which can then be output as data 830. It will be understood that, in fact, parallel unit 950 need not perform parallel-to-serial conversion, so long as the data input to the corresponding SATL transmitter is also a serial bitstream.

As will be appreciated, one approach to implementing parallel unit 950 is through the use of a shift register. Symbol decoder 930, in order to synchronize its operations with those of parallel unit 950, also provides other signals than enable parallel unit 950 to discern when its operations should be performed. Symbol decoder 930 thus generates a DataValid 960 in order to indicate to parallel unit 950 that the data bit presented as BitLine signal 940 is valid, and can be shifted into parallel unit 950. Symbol decoder 930 also provides a SyncDetect signal 970 to parallel unit 950, to indicate the boundary between data words. Thus, at the point at which symbol decoder 930 decodes a "SYNC" symbol, symbol decoder 930 generates SyncDetect signal 970 to re-initialize parallel unit 950. This also indicates to parallel unit 950 that the bit available on BitLine signal 940 is complete and can be shifted into parallel unit 950. Once a sufficient number of bits is shifted into parallel unit 950, the resulting data word is output as data 830, and parallel unit 950 shifts in the bits of the next data word.

Figure 10:
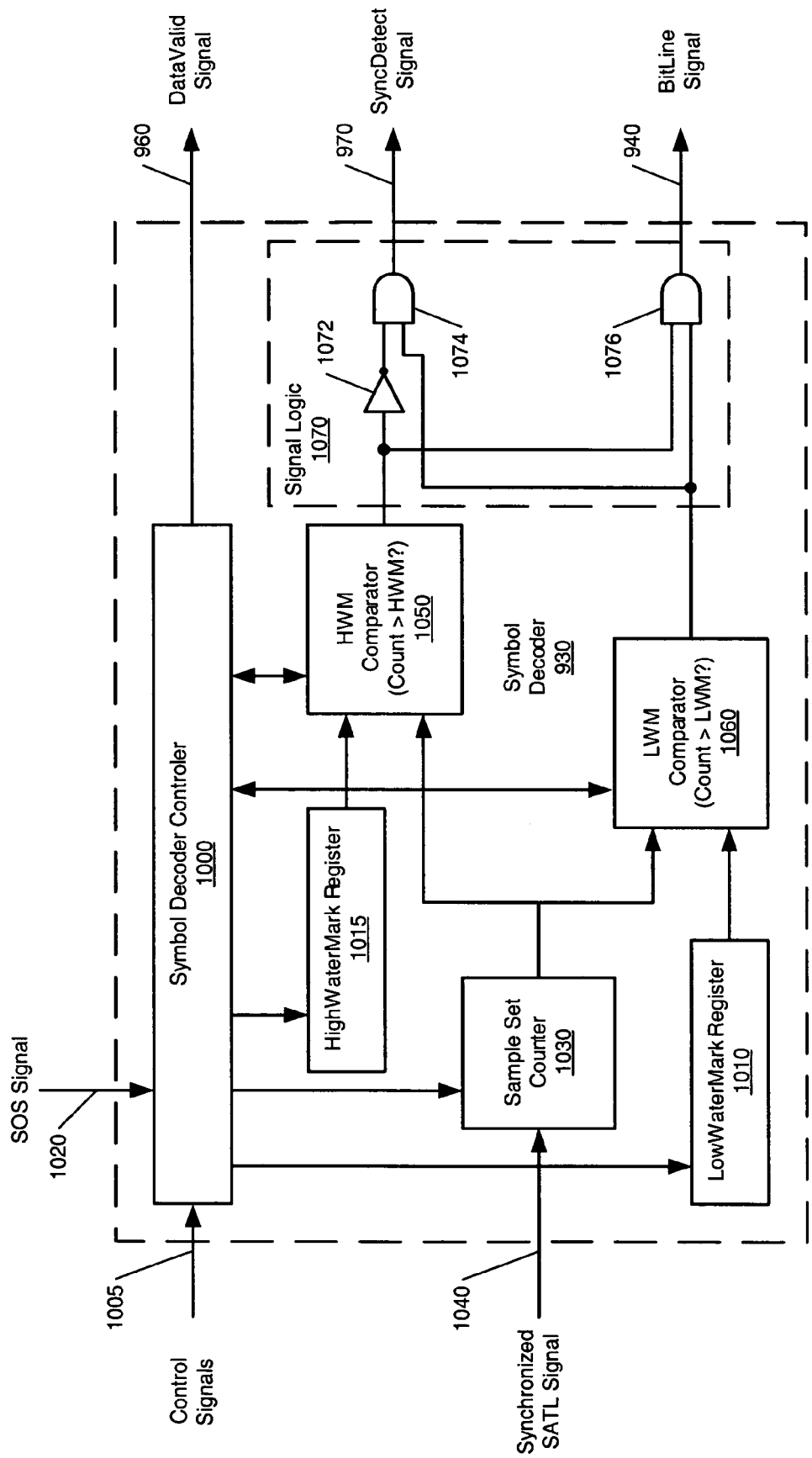
FIG. 10 is a block diagram illustrating a symbol encoder according to the present invention.

FIG. 10 is a block diagram illustrating symbol encoder 930 in greater detail. As before, symbol decoder 930 provides a data value (e.g., one or more data bits) at BitLine signal 940, and provides DataValid signal 960 and SyncDetect signal 970 to parallel unit 950 in order to allow parallel unit 950 to determine the various extents of the data received by parallel unit 950. Symbol decoder 930 is controlled by a symbol decoder controller 1000, which provides control and clocking signals to various elements of symbol decoder 930. Symbol decoder controller 1000, among other tasks, is responsible for setting various parameters within symbol decoder 930, to allow for the proper operation of symbol decoder 930, and thus provide for the proper decoding of the symbols received thereby. In configuring symbol decoder 930, symbol decoder controller 1000 receives control signals (control signals 1005) that determine the manner in which symbol decoder controller 1000 programs symbol decoder 930 for operation.

Thus, under the control of control signals 1005, symbol decoder controller 1000 stores a LowWaterMark value in a LowWaterMark register 1010 and a HighWaterMark value in a HighWaterMark register 1015. As will be appreciated, LowWaterMark register 1010 and HighWaterMark register 1015 can, in fact, be implemented using any suitable type of storage unit. Symbol decoder controller 1000 receives control signals 1005 from receive controller 900 (as shown in FIG. 9). Symbol decoder controller 1000 also receives an SOS signal 1020 from the SOS detector of SATL receiver 800 (depicted as SOS detector 920 in FIG. 9). As noted, SOS signal 1020 indicates to symbol decoder 930 (and, more particularly, symbol decoder controller 1000) that a start-of-symbol has been received. In certain embodiments of the present invention, this function is performed by detecting a low-to-high transition in SATL signal 810. This event has a number of effects.

Upon receipt of an SOS, symbol decoder controller 1000 resets a sample set counter 1030 to an initial value (e.g., middlePoint). Sample set counter 1030 maintains a count of the values of samples of the signal received by symbol decoder 930 (depicted in FIG. 10 as a synchronized SATL signal 1040). Upon the receipt of an SOS indication via SOS signal 1020, symbol decoder controller 1000 also causes a HighWaterMark (HWM) comparator 1050 to compare the value (or count) held in sample set counter 1030 with the HighWaterMark value held in HWM register 1015. More specifically, HWM comparator 1050 determines if the count (in fact, setSampleCnt) is greater than the HWM held in HWM comparator 1050. Similarly, symbol decoder controller 1000, upon the receipt of an SOS indication, causes an LWM comparator 1060 to compare the value (count) held in sample set counter 1030 with the LWM held in LWM register 1010. More specifically, LWM comparator 1060 determines if the count (setSampleCnt) is greater than the LWM. As will be appreciated, the actual value of the HWM and/or the actual value of the LWM can be included or excluded from the range of values that generate a logic "1" or logic "0" on BitLine signal 940, as well as those that assert SyncDetect signal 970, by choosing an appropriate comparison to make (e.g., selecting a relationship such as greater than, greater than or equal to, less than, less than or equal to, or the like).

The results of the foregoing comparisons are then provided to signal logic 1070, which in turn generates BitLine signal 940 and SyncDetect signal 970. Signal logic 1070 includes an inverter 1072, an AND gate 1074 and an AND gate 1076. Inverter 1072 and AND gate 1074 combine the outputs from HWM comparator 1050 and LWM comparator 1060 in order to generate SyncDetect signal 970. SyncDetect signal 970 indicates to parallel unit 950 that a "SYNC" symbol was received, and that the data word being shifted into parallel unit 950 is now complete and can be presented as data 830. SyncDetect signal 970 can also be used to re-align (i.e., synchronize) parallel unit 950, in the case where SATL receiver 800 has lost synchronization with SATL signal 810.

In a similar fashion, AND gate 1076 performs a logical AND between the output of HWM comparator 1050 and LWM comparator 1060 in order to generate BitLine signal 940. BitLine signal 940 provides the value of the current data bit for shifting into parallel unit 950. Symbol decoder controller 1000 also generates a DataValid signal 960, which indicates a point in time at which BitLine signal 940 presents a valid data bit. It will be appreciated that if DataValid signal 960 is not asserted, BitLine signal 940 is ignored. This can also be characterized in terms of BitLine signal 940 being ignored if SyncDetect signal 970 is asserted.

The foregoing signals and their values, in terms of the earlier example, are given in Table 4, which reflects the states of SATL receiver 800 during normal operation, in which SATL receiver 800 synchronized with SATL signal 810.

TABLE 4

Certain signals within SATL receiver 800 and their values.

| Signal | Symbol = "1" | Symbol = "SYNC" | Symbol = "0" |
|---|---|---|---|
| HWM comparator 1050 (output) | 1 | 0 | 0 |
| LWM comparator 1060 (output) | 1 | 1 | 0 |
| BitLine signal 940 | 1 | 0 | 0 |
| DataValid signal 960 | 1 | 0 | 1 |
| SyncDetect signal 970 | 0 | 1 | 0 |

Figure 11:
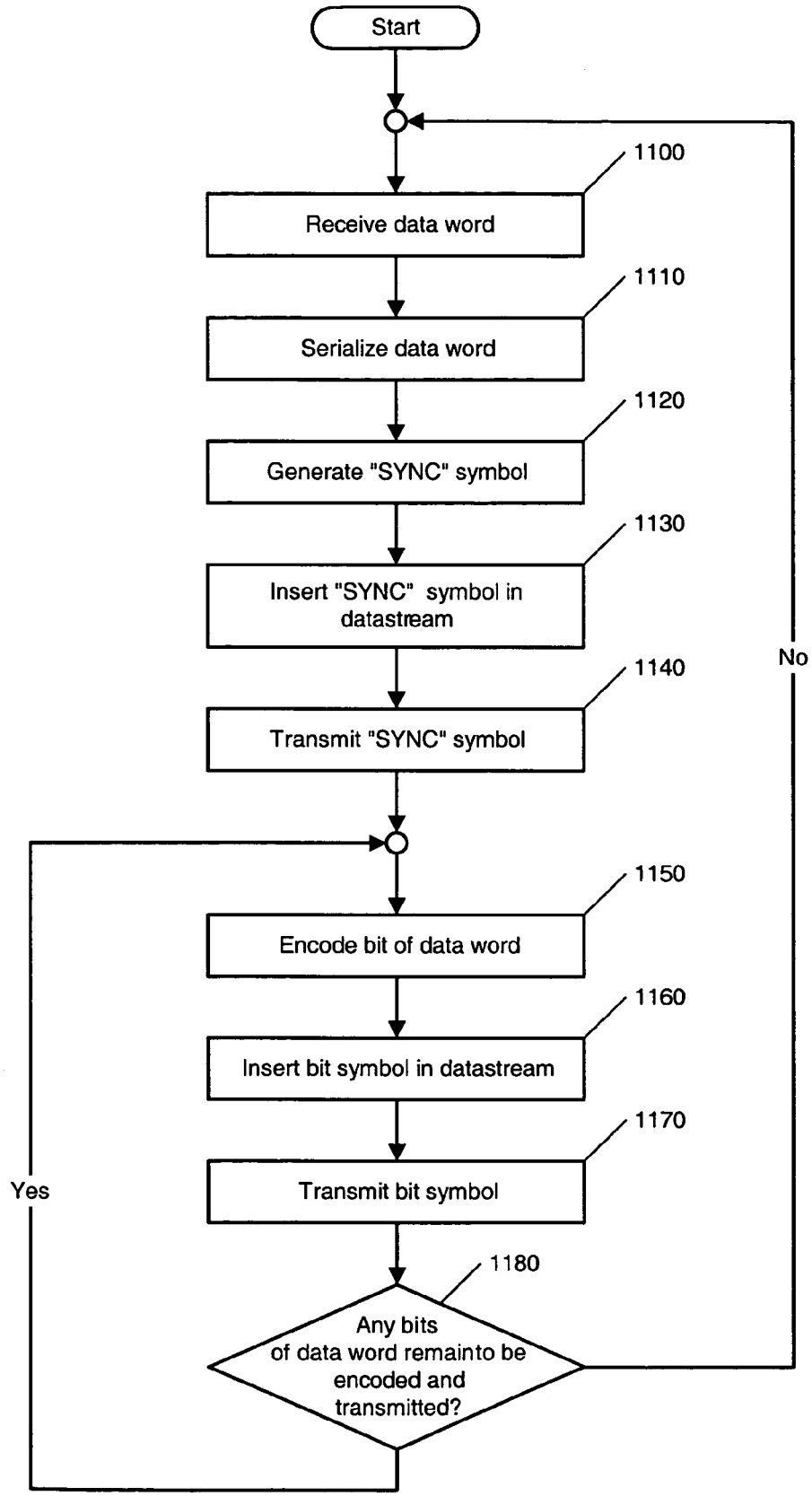
FIG. 11 is a flow diagram illustrating a process of transmitting a data word according to the present invention.

FIG. 11 is a flow diagram illustrating a process of transmitting a data word according to the present invention. The process begins with an SATL transmitter such as SATL transmitter 600 receiving a data word (step 1100). The SATL transmitter then serializes the data word (as is performed in FIG. 7 by register 710 and multiplexer 720) (step 1110). Next, a "SYNC" symbol is generated by the SATL transmitter's transmit controller sending a SendSync signal to the SATL transmitter's encoder (step 1120). The encoder inserts the "SYNC" symbol in the datastream, as the bits that represent the "SYNC" symbol are generated (step 1130). The SATL transmitter sends the "SYNC" symbol by transmitting those bits (depicted in FIG. 7 via a shift register (shift register 750) being loaded with, and then shifting out, the requisite bits) (step 1140).

The process of transmitting the data word received by the SATL transmitter is then begun. This portion of the process begins with the encoding of a bit of the data word into a symbol representing the bit's value (step 1150). Next, the symbol for that bit is inserted into the datastream (step 1160). The bits that make up the symbol for the bit of the data word are transmitted serially (step 1170). A determination is then made as to whether bits of the data word remain to be encoded and transmitted in the manner just described (step 1180). If further bits of the data word remain, those bits are encoded (step 1150), the bits of the symbol representing the bit of the data word are then inserted into the datastream (step 1160) and those bits transmitted (step 1170). If the current data word's bits have been encoded and transmitted, the SATL transmitter is then ready to accept the next data word (step 1100).

As will be appreciated, the process of encoding and transmitting the bits of the current data word can be repeated any number of times, although it may be desirable to send a "SYNC" symbol with greater frequency than one "SYNC" symbol per data word, if the length of the data word becomes relatively large (e.g., in the case where the period between "SYNC" symbols becomes so great as to make the probability of losing synchronization unacceptably high). Moreover, it will be appreciated that the operations of encoding and transmitting a data word can be overlapped with the receipt (and, optionally, storage) of another data word, as is possible with others of the operations described herein.

Figure 12:
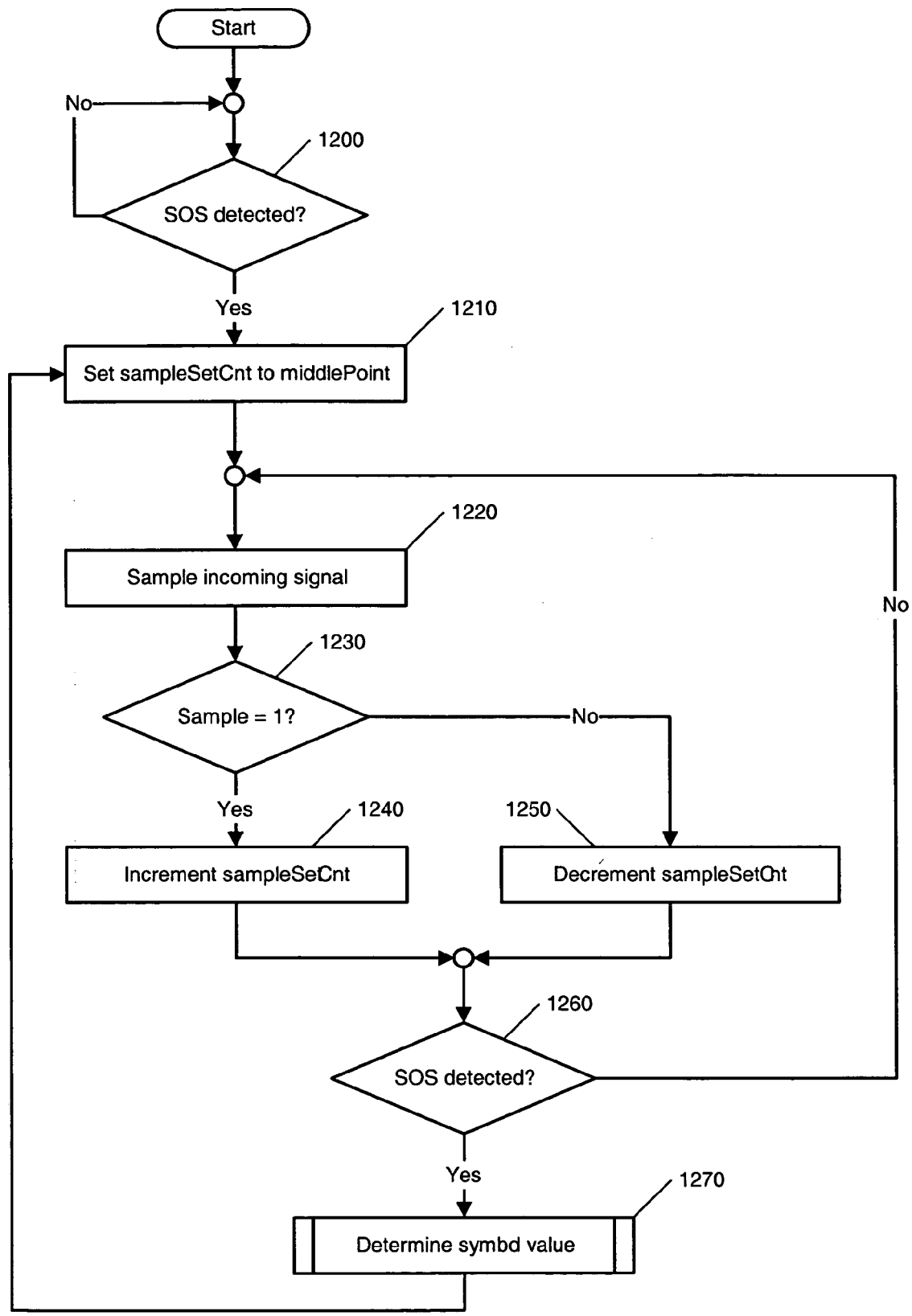
FIG. 12 is a flow diagram of a process reflecting one example of the operations performed by a symbol decoder according the present invention.

FIG. 12 is a flow diagram of a process reflecting one example of the operations performed by a symbol decoder, such as symbol decoder 930 of SATL receiver 800 in FIG. 9, according the present invention. As noted, symbol decoder 930 is shown in greater detail in FIG. 10, and the operations now discussed are best understood with reference to the elements of FIG. 10. The process begins with the detection of a start-of-symbol (step 1200). So long as a start-of-symbol (SOS) is not detected, the process loops, awaiting an SOS. Once an SOS is detected, the sample set counter (e.g., sample set counter 1030) is loaded with a value equal to the middle-point value (step 1210). This prepares the sample set counter to count the samples of the zeroes and ones that make up the symbols received by the SATL receiver.

Next, the incoming signal is sampled (step 1220). A determination is then made as to the sample's value (step 1230). If the sample indicates that the value of the incoming signal is a logic "1," the sample set counter (represented by the variable sampleSetCnt) is incremented (step 1240). Alternatively, if the logical value of the incoming signal is "0" at the sampling point, the sample set counter is decremented (step 1250). A determination is then made as to whether another SOS has been detected (step 1260). If an SOS has not been detected, indicating that the current symbol is not yet complete, the process loops to again sample the incoming symbol (step 1220), and determine whether the sample set counter should be incremented or decremented (steps 1230, 1240, and 1250). If an SOS is detected, the received symbol's value is then determined (step 1270), and the process of receiving the next symbol begins (step 1210). The process of determining the value of the received symbol (step 1270) is discussed in greater detail in connection with FIG. 13, below.

As will be appreciated, in one embodiment, sampleSetCnt first undergoes a number of increment operations, followed by number of decrement operations (as demonstrated in the example previously discussed). Thus, the branch in the flow diagram containing step 1240 is taken some number of times, followed by the branch in the flow diagram containing step 1250 being taken some number of times. The number of times each is taken reflects the symbol received.

As will also be appreciated, in another embodiment, such a process is implemented by starting with the detection of an SOS (which can be equated with the first sampling of a logic 1). Next, the value of sampleSetCnt is incremented on each clock cycle of $R_{CLK}$, until a logic 0 is detected (ideally, this is co-incident with the high-to-low transition in the SATL signal, but more likely, is simply the first sample that indicates a logic 0). The value of sampleSetCnt is then decremented on each clock cycle of $R_{CLK}$, until the next SOS. Sampling in this case is only used to determine when the sampled value changes. This could also be implemented using two counters, one configured to count only when the sample value indicates a logic 1 and the other configured to count only when the sample value indicates a logic 0, although greater resources might be consumed by such an implementation.

Figure 13:
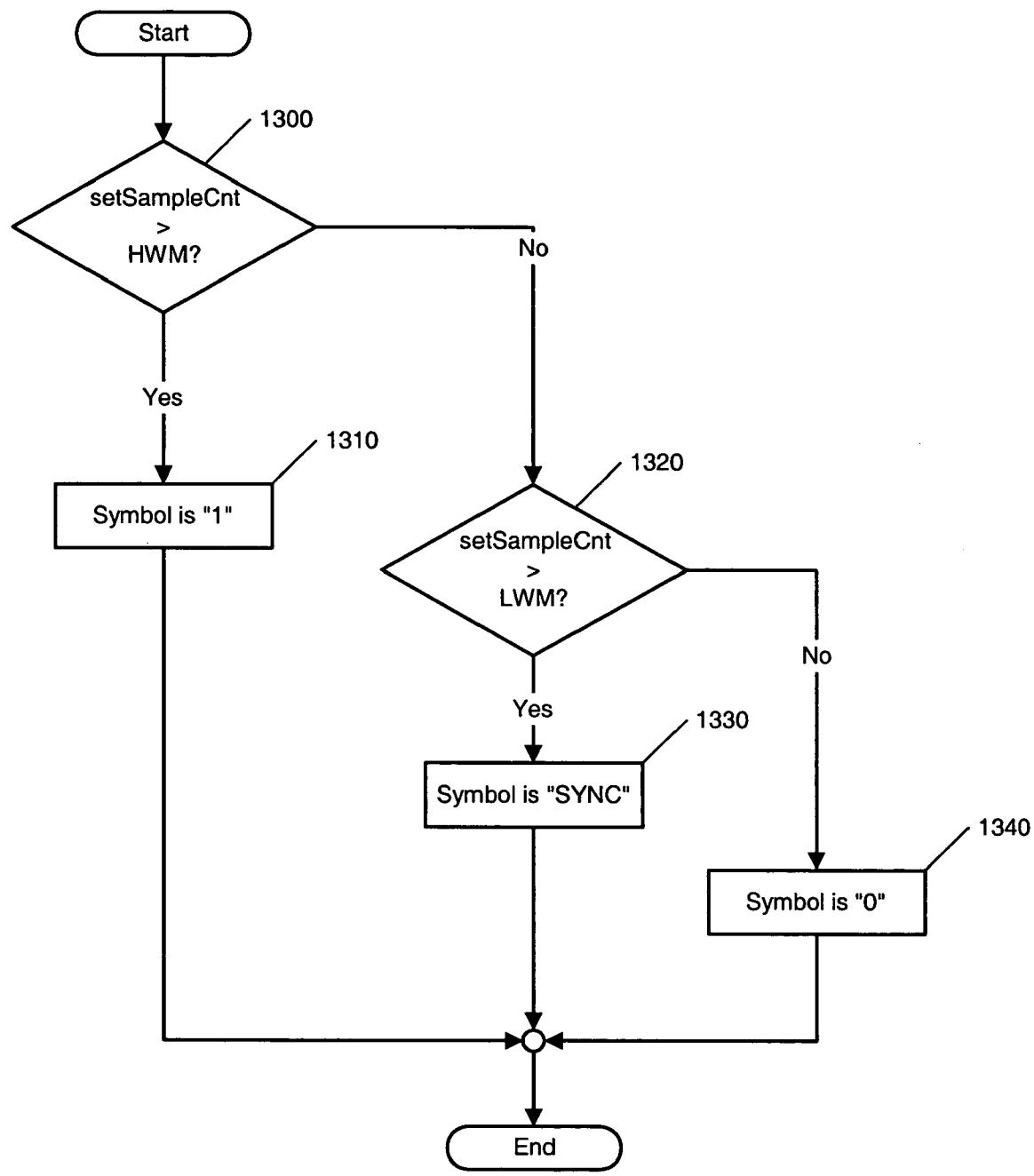
FIG. 13 is a flow diagram illustrating a process for decoding a symbol according to the present invention.

FIG. 13 is a flow diagram illustrating a process for decoding a symbol according to the present invention. As will be appreciated, the process depicted in FIG. 13 is an example of a process according to the present invention that can be carried out by the symbol decoder of FIG. 10 (symbol decoder 930). The process begins with a comparison of setSampleCnt with the HWM (step 1300). A similar comparison is made between setSampleCnt and the LWM value held in LWM register 1010 by LWM comparator 1060. As will be appreciated, if setSampleCnt is greater than HWM, setSampleCnt will also be greater than LWM. Thus, if setSampleCnt is greater than HWM, the symbol received is taken to be a "1" (step 1310). This indicates that the number by which setSampleCnt is incremented from the middlePoint, less the number by which setSampleCnt is decremented, is above the middlePoint by at least the serialBitMargin.

Otherwise, the value of setSampleCnt is compared to the LWM (step 1320) in a manner similar to the previous comparison. If setSampleCnt is greater than the LWM, setSampleCnt is between the LWM and the HWM (step 1320). If such is the case, the symbol decoded is a "SYNC" symbol (step 1330). Otherwise, if setSampleCnt is less than the LWM (it being axiomatic that if setSampleCnt is less than the LWM, setSampleCnt will be less than the HWM), the symbol is a "0" (step 1340).

As will be appreciated, the process of FIG. 13 can also be discussed in terms of the symbol decoder of FIG. 10 (symbol decoder 930). The comparison of the value held in sample set counter 1030 (setSampleCnt) with the HWM value stored in HWM register 1015 is performed by HWM comparator 1050 (step 1300). As noted, a similar comparison, between setSampleCnt and the LWM value held in LWM register 1010, is made by LWM comparator 1060 (step 1320). The results of these comparisons are then combined by signal logic 1070, in order to identify the symbol indicated by these comparisons (steps 1310, 1330 and 1340).

More specifically, if setSampleCnt is greater than the HWM (and so greater than the LWM), the output of HWM comparator 1050 is a logical "1", as is the output of LWM comparator 1060. Alternatively, if setSampleCnt is not greater than the LWM (and so not greater the HWM), the output of LWM comparator 1060 is a logical "0", as is the output of HWM comparator 1050. The outputs of HWM comparator 1050 and LWM comparator 1060 are then AND'ed together by AND gate 1076 to produce BitLine signal 940, which indicates a logic "1" in the former case, and a logic "0" in the latter case. As noted previously, DataValid signal 960 indicates the point in time at which the value indicated of BitLine signal 940 is valid.

If, however, setSampleCnt is not greater than the HWM, but is greater than the LWM, the output of HWM comparator 1050 is a logical "0", while the output of LWM comparator 1060 is a logical "1". The output of HWM comparator 1050 is thus inverted by inverter 1072, in order to properly detect this case. The output of inverter 1072 (the inverted output of HWM comparator 1050) and the output of LWM comparator 1060 are then AND'ed together by AND gate 1074 to produce SyncDetect signal 970, which indicates a logic "1" in the case where a "SYNC" symbol is detected, and a logic "0" otherwise. In the former case, setSampleCnt is between the LWM and the HWM (step 1320), and the symbol decoded is a "SYNC" symbol (step 1330).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A receiver comprising:
   a symbol decoder, wherein
      said symbol decoder comprises
         a counter,
         a first comparator, coupled to said counter, and
         a second comparator, coupled to said counter; and
   a start-of-symbol detector, coupled to receive a start-of-symbol signal from said symbol decoder.

2. The receiver of claim 1, wherein said symbol decoder further comprises:
   a first storage unit, coupled to said first comparator; and
   a second storage unit, coupled to said second comparator.

3. The receiver of claim 2, wherein
   said first storage unit is configured to store a HighWaterMark, and
   said second storage unit is configured to store a LowWaterMark.

4. The receiver of claim 2, wherein
   said counter is configured to maintain a setSampleCnt,
   said first storage unit is configured to store a HighWaterMark,
   said second storage unit is configured to store a LowWaterMark,
   said first comparator is configured to determine if said setSampleCnt is greater than said HighWaterMark, and
   said second comparator is configured to determine if said setSampleCnt is greater than said LowWaterMark.

5. The receiver of claim 4, wherein said symbol decoder further comprises:
   signal logic, wherein
      said signal logic is coupled to said first comparator and said second comparator, and said signal logic is configured to generate a SyncDetect signal.

6. The receiver of claim 5, wherein
said signal logic is configured to generate a SyncDetect signal, and
said SyncDetect signal is asserted if said setSampleCnt is not greater than said HighWaterMark and said setSampleCnt is greater than said LowWaterMark.

7. The receiver of claim 4, wherein
said signal logic is further configured to generate a BitLine signal,
said BitLine signal is equal to an output of said first comparator, if said setSampleCnt is greater than said HighWaterMark, and
said BitLine signal is equal to an output of said second comparator, if said setSampleCnt is not greater than said LowWaterMark.

8. The receiver of claim 4, wherein said symbol decoder further comprises:
a symbol decoder controller, wherein
said symbol decoder controller is coupled to said first comparator and said second comparator,
said symbol decoder controller is configured to generate a DataValid signal, and
said DataValid signal is asserted if said setSampleCnt is greater than said HighWaterMark or said setSampleCnt is not greater than said LowWaterMark.

9. The receiver of claim 1, wherein
said symbol decoder is configured to
receive a symbol,
indicate said symbol is a synchronization symbol, if said symbol is said synchronization symbol, and
generate a data value, if said symbol is not a synchronization symbol.

10. The receiver of claim 9, wherein
said symbol comprises a plurality of symbol elements,
each of a first number of said symbol elements is set to a first logical value, if said data value is equal to a first value,
each of a second number of said symbol elements is set to said first logical value, if said data value is equal to a second value, and
each of a third number of said symbol elements is set to said first logical value, if said symbol is said synchronization symbol.

11. The receiver of claim 10, wherein
said first number is greater than said second number,
said third number is not equal to said first number, and
said third number is not equal to said second number.

12. The receiver of claim 11, wherein
said third number is less than said first number, and
said third number is greater than said second number.

13. The receiver of claim 12, wherein
each of a fourth number of said symbol elements is set to a second logical value, if said data value is equal to said first value,
each of a fifth number of said symbol elements is set to said second logical value, if said data value is equal to said second value, and
each of a sixth number of said symbol elements is set to said second logical value, if said symbol is said synchronization symbol.

14. The receiver of claim 1, further comprising:
a synchronizer, coupled to said symbol decoder and said start-of-symbol detector; and
a parallel unit, coupled to said symbol.

15. The receiver of claim 14, wherein
said symbol decoder is configured to provide a SyncDetect signal, a BitLine signal and a DataValid signal to said parallel unit.

16. The receiver of claim 14, wherein
said synchronizer is a dual-rank synchronizer.

17. A transmitter comprising:
an encoder, wherein
said encoder is configured to generate a symbol based on a value of information received by said encoder,
said symbol comprises a plurality of symbol elements,
said encoder is further configured to set each of a first number of said symbol elements to a first logical value, if said value is equal to a first value,
said encoder is further configured to set each of a second number of said symbol elements to said first logical value, if said value is equal to a second value,
said encoder is further configured to set each of a third number of said symbol elements to said first logical value, if said encoder is to generate a synchronization symbol,
said first number is greater than said second number,
said third number is not equal to said first number, and
said third number is not equal to said second number.

18. The transmitter of claim 17, wherein
said third number is less than said first number, and
said third number is greater than said second number.

19. The transmitter of claim 18, wherein
said encoder is further configured to set each of a fourth number of said symbol elements to a second logical value, if said value is equal to said first value,
said encoder is further configured to set each of a fifth number of said symbol elements to said second logical value, if said value is equal to said second value, and
said encoder is further configured to set each of a sixth number of said symbol elements to said second logical value, if said encoder is to generate said synchronization symbol.

20. The transmitter of claim 19, wherein
said fourth number is less than said fifth number,
said sixth number is not equal to said fourth number, and
said sixth number is not equal to said fifth number.

21. The transmitter of claim 20, wherein
said sixth number is greater than said fourth number, and
said sixth number is less than said fifth number.

22. The transmitter of claim 21, wherein
each of said symbol elements is a bit,
said first logical value is a logical one, and
said second logical value is a logical zero.

23. The transmitter of claim 17, further comprising:
a SendSync signal input, wherein
said encoder is further configured to receive a SendSync signal at said SendSync signal input and to generate said synchronization symbol upon an assertion of said SendSync signal.

24. The transmitter of claim 23, wherein
said third number is less than said first number, and
said third number is greater than said second number.

25. The transmitter of claim 24, wherein
said encoder is further configured to set each of a fourth number of said symbol elements to a second logical value, if said value is equal to said first value,
said encoder is further configured to set each of a fifth number of said symbol elements to said second logical value, if said value is equal to said second value, and said encoder is further configured to set each of a sixth number of said symbol elements to said second logical value, if said encoder is to generate said synchronization symbol.

26. The transmitter of claim 23, further comprising:
a serializer, coupled to said encoder.

27. A method comprising:
receiving a symbol;
incrementing a count in response to said symbol;
decrementing said count in response to said symbol;
comparing said count to a first limit; and
generating a data value, wherein
  said generating is based on said comparing said count to said first limit.

28. The method of claim 27, further comprising:
comparing said count to a second limit, wherein
  said generating is further based on said comparing said count to said second limit.

29. The method of claim 28, further comprising:
receiving a start-of-symbol.

30. The method of claim 29, further comprising:
causing said comparing said count to said first limit and said comparing said count to said second limit to be performed upon said receiving said start-of-symbol.

31. The method of claim 29, wherein
said count is reset in response to said receiving said start-of-symbol.

32. The method of claim 31, wherein
said count is reset to a middlePoint value.

33. The method of claim 28, wherein
said first limit is a HighWaterMark, and
said second limit is a LowWaterMark.

34. The method of claim 33, wherein said generating said data value comprises:
generating a first data value, if said count is greater than said HighWaterMark, and
generating a second data value, if said count is not greater than said LowWaterMark.

35. The method of claim 34, wherein
said first data value is a logic "1", and
said second data value is a logic "0".

36. The method of claim 33, further comprising:
indicating that said symbol is a synchronization symbol, if said count is not greater than said HighWaterMark and greater than said LowWaterMark.

37. The method of claim 27, wherein said receiving said symbol comprises:
sampling a signal, wherein
  said signal represents said symbol.

38. The method of claim 37, wherein
said sampling is performed on each cycle of a receive clock.

39. The method of claim 37, further comprising:
incrementing said count for each cycle of a receive clock, while said signal is equal to a first value; and
decrementing said count for each cycle of said receive clock, while said signal is equal to a second value.

40. The method of claim 37, wherein said sampling generates a plurality of sample values, and further comprising:
incrementing said count for each of said sample values that is equal to a first value; and
decrementing said count for each of said sample values that is equal to a second value.

41. The method of claim 40, further comprising:
receiving a start-of-symbol.

42. The method of claim 41, further comprising:
resetting said count to a middlePoint value in response to said receiving said start-of-symbol; and
causing said comparing said count to said first limit and said comparing said count to said second limit to be performed upon said receiving said start-of-symbol.

43. The method of claim 37, wherein
said sampling is performed using a receive clock,
said signal is generated using a transmit clock, and
a receive clock frequency of said receive clock is greater than a transmit clock frequency of said transmit clock.

44. The method of claim 43, wherein
a ratio of said receive clock frequency to said transmit clock frequency is greater than 1:1 and not greater than a maxClockRatio.

45. The method of claim 43, further comprising:
receiving a start-of-symbol; and
resetting said count to a middlePoint in response to said receiving said start-of-symbol,
  wherein
  said symbol comprises a plurality of symbol elements, and
  said middlePoint is greater than a number of said symbol elements plus a serialBitMargin, multiplied by said maxClockRatio.

46. The method of claim 27, wherein
said symbol comprises a plurality of symbol elements,
said symbol represents a logic "1" if a first number of said symbol elements are a first value, and
said symbol represents a logic "0" if a second number of said symbol elements are said first value.

47. The method of claim 46, wherein
said symbol is a synchronization symbol if a third number of said symbol elements are a first value,
said third number is not greater than said first number, and
said third number is greater than said second number.

48. An apparatus comprising:
means for receiving a symbol;
means for incrementing a count in response to said symbol;
means for decrementing said count in response to said symbol;
means for comparing said count to a first limit; and
means for generating a data value, wherein
  said means for generating uses an output of said means for comparing said count to said first limit.

49. The apparatus of claim 48, further comprising:
means for comparing said count to a second limit, wherein
  said means for generating is further based on an output of said means for comparing said count to said second limit.

50. The apparatus of claim 49, further comprising:
means for receiving a start-of-symbol.

51. The apparatus of claim 50, further comprising:
means for causing said means for comparing said count to said first limit and said means for comparing said count to said second limit to operate in response to said start-of-symbol being received.

52. The apparatus of claim 50, wherein
said count is reset in response to said start-of-symbol being received.

53. The apparatus of claim 48, wherein said means for receiving said symbol comprises:
means for sampling a signal, wherein
  said signal represents said symbol.

54. The apparatus of claim 53, wherein
said means for sampling is configured to perform sampling on each cycle of a receive clock.

55. The apparatus of claim 53, further comprising:
means for incrementing said count for each cycle of a receive clock, while said signal is equal to a first value, and
means for decrementing said count for each cycle of said receive clock, while said signal is equal to a second value.

56. The apparatus of claim 53, wherein said means for sampling generates a plurality of sample values, and further comprising:
means for incrementing said count for each of said sample values that is equal to a first value; and
means for decrementing said count for each of said sample values that is equal to a second value.

57. The apparatus of claim 56, further comprising:
means for receiving a start-of-symbol.

58. The apparatus of claim 57, further comprising:
means for resetting said count to a middlePoint value in response to said start-of-symbol being received;
means for causing said means for comparing said count to said first limit to compare said count to said first limit upon said start-of-symbol being received; and
means for causing said means for comparing said count to said second limit to compare said count to said second limit upon said start-of-symbol being received.

59. The apparatus of claim 53, wherein
said means for sampling is configured to receive a receive clock,
said signal is generated using a transmit clock, and
a receive clock frequency of said receive clock is greater than a transmit clock frequency of said transmit clock.

60. The apparatus of claim 59, wherein
a ratio of said receive clock frequency to said transmit clock frequency is greater than 1:1 and not greater than a maxClockRatio.

61. The apparatus of claim 59, further comprising:
means for receiving a start-of-symbol; and
means for resetting said count to a middlePoint in response to said start-of-symbol being received, wherein
said symbol comprises a plurality of symbol elements, and
said middlePoint is greater than a number of said symbol elements plus a serialBitMargin, multiplied by said maxClockRatio.

62. The apparatus of claim 48, wherein
said symbol comprises a plurality of symbol elements,
said symbol represents a logic "1" if a first number of said symbol elements are a first value, and
said symbol represents a logic "0" if a second number of said symbol elements are said first value.

63. The apparatus of claim 62, wherein
said symbol is a synchronization symbol if a third number of said symbol elements are a first value,
said third number is not greater than said first number, and
said third number is greater than said second number.

64. A method comprising:
generating a first number of a first plurality of symbol elements of a first symbol, wherein
said first symbol is a synchronization symbol, and
each of said first number of said first plurality of symbol elements have a first logical value; and
generating a second number of a second plurality of symbol elements of a second symbol, wherein
said second symbol represents a data value of data encoded in said second symbol,
each of said second number of said second plurality of symbol elements have said first logical value,
said first number is not equal to said second number,
said second number is equal to a third number, if said data value is equal to a first value,
said second number is equal to a fourth number, if said data value is equal to a second value, and
said third number is greater than said fourth number.

65. The method of claim 64, further comprising:
generating a fifth number of a third plurality of symbol elements of said first symbol,
wherein
each of said fifth number of said third plurality of symbol elements have a second logical value; and
generating a sixth number of a fourth plurality of symbol elements of said second symbol, wherein
each of said sixth number of said fourth plurality of symbol elements have said second logical value,
said fifth number is not equal to said sixth number,
said second number is equal to a seventh number, if said data value is equal to said first value,
said second number is equal to a eighth number, if said data value is equal to said second value, and
said seventh number is less than said eighth number.

66. The method of claim 65, further comprising:
transmitting said first plurality of symbol elements;
transmitting said third plurality of symbol elements after said first plurality of symbol elements are transmitted,
transmitting said second plurality of symbol elements, and
transmitting said fourth plurality of symbol elements after said second plurality of symbol elements are transmitted.

67. The method of claim 65, wherein
said first number is less than said third number,
said first number is greater than said fourth number,
said fifth number is greater than said seventh number, and
said fifth number is less than said eighth number.

68. The method of claim 65, wherein
each of said first plurality of symbol elements is a bit,
each of said second plurality of symbol elements is a bit,
each of said third plurality of symbol elements is a bit,
each of said fourth plurality of symbol elements is a bit,
said first logical value is a logical one, and
said second logical value is a logical zero.

69. The method of claim 68, wherein
said first number is not greater than said third number, and
said first number is greater than said fourth number.

70. An apparatus comprising:
means for generating a first number of a first plurality of symbol elements of a first symbol, wherein
said first symbol is a synchronization symbol, and
each of said first number of said first plurality of symbol elements have a first logical value; and
means for generating a second number of a second plurality of symbol elements of a second symbol, wherein
said second symbol represents a data value of data encoded in said second symbol,
each of said second number of said second plurality of symbol elements have said first logical value,
said first number is not equal to said second number,
said second number is equal to a third number, if said data value is equal to a first value,
said second number is equal to a fourth number, if said data value is equal to a second value, and
said third number is greater than said fourth number.

71. The apparatus of claim 70, further comprising:
means for generating a fifth number of a third plurality of symbol elements of said first symbol, wherein each of said fifth number of said third plurality of symbol elements have a second logical value; and means for generating a sixth number of a fourth plurality of symbol elements of said second symbol, wherein each of said sixth number of said fourth plurality of symbol elements have said second logical value, said fifth number is not equal to said sixth number, said second number is equal to a seventh number, if said data value is equal to said first value, said second number is equal to a eighth number, if said data value is equal to said second value, and said seventh number is less than said eighth number.

72. The apparatus of claim 71, further comprising:

means for transmitting said first plurality of symbol elements;

means for transmitting said third plurality of symbol elements after said first plurality of symbol elements are transmitted, means for transmitting said second plurality of symbol elements, and means for transmitting said fourth plurality of symbol elements after said second plurality of symbol elements are transmitted.

73. The apparatus of claim 71, wherein said first number is less than said third number, said first number is greater than said fourth number, said fifth number is greater than said seventh number, and said fifth number is less than said eighth number.

74. The apparatus of claim 71, wherein each of said first plurality of symbol elements is a bit, each of said second plurality of symbol elements is a bit, each of said third plurality of symbol elements is a bit, each of said fourth plurality of symbol elements is a bit, said first logical value is a logical one, and said second logical value is a logical zero.

75. The apparatus of claim 74, wherein said first number is not greater than said third number, and said first number is greater than said fourth number.

\* \* \* \* \*